March 1, 1960 W. H. McLELLAN 2,927,273
GALVANOMETER

Filed Aug. 8, 1957 2 Sheets-Sheet 1

INVENTOR.
WILLIAM H. MC LELLAN.
BY
Christie, Parker & Hale
ATTORNEYS

March 1, 1960 W. H. McLELLAN 2,927,273
GALVANOMETER

Filed Aug. 8, 1957 2 Sheets-Sheet 2

INVENTOR.
WILLIAM H. MC LELLAN
BY
Christie, Parker & Hale
ATTORNEYS

United States Patent Office 2,927,273
Patented Mar. 1, 1960

2,927,273

GALVANOMETER

William H. McLellan, Pasadena, Calif., assignor to Consolidated Electrodynamics Corporation, Pasadena, Calif., a corporation of California Application August 8, 1957, Serial No. 677,125

4 Claims. (Cl. 324—154)

This invention relates to galvanometers of the type adapted to respond to alternating or oscillating voltages and particularly to the type of laboratory or portable galvanometer used for recording alternating voltage oscillations.

Elements of a typical galvanometer of this type are a lightweight coil of wire, magnet means for developing a magnetic field, a suspension for holding the coil in the magnetic field and a mirror. The coil is held in suspension between a pair of stretched wires or ribbons anchored at opposite ends to the body of the galvanometer. By means of this suspension the coil is positioned in the magnetic field created by a pair of opposed magnetic poles. The mirror is affixed to the upper portion of the suspension a short distance above the coil.

The electrical signal to be measured is applied to terminal ends of the coil. The passage of current through the coil causes the coil to rotate about its longitudinal axis. This angular motion induced by the passage of current is opposed by the restraining torque of the suspension so that for a given current in a given suspension the angular deflection of the coil represents a balance between these two forces. While the restraining force of the suspension is a constant for a given suspension, the angular motion of the coil is proportional to the amount of current passing through the coil. Since the mirror attached to the suspension wire oscillates in response to the oscillations of the coil, a light beam reflected from the mirror against a surface such as a light sensitive film can be adapted to provide a continuous record of the instantaneous current passing through the system.

In order to control the frequency response of the galvanometer, damping systems are frequently employed. Damping systems also serve to protect the galvanometer against violent overswings and to control the time taken to respond to a sudden change in current. In one type of damping, called fluid-damping, the suspension system and coil are placed within a tube filled with a viscous fluid. The viscous fluid in which the coil and suspension are immersed reduces the oscillations of these elements at their natural frequency when sudden changes in current occur.

My invention is a fluid-damping arrangement for use in a galvanometer having a coil suspended by upper and lower suspension means between magnetic poles enclosed in a case. The damping arrangement comprises a separate tube enclosed entirely within the case of a galvanometer. The tube surrounds the entire lower suspension, the coil and part of the upper suspension. A cap is sealed in the bottom end of the tube to make the tube fluid tight and to provide a means for anchoring the lower end of the lower suspension means. A flexible supporting means is adapted to support the upper end of the tube with relation to the galvanometer case. The invention also encompasses the unique flexible supporting means by which the damping tube is supported.

In fluid-damping arrangements, glass tubes are generally used because of the insulating property of the glass and the ease with which the coil and suspension may be inspected. It is necessary that the upper end of the damping tube be supported in some manner. This is so that the pre-established coaxial alignment between the tube and the enclosed coil and suspension means is maintained while the galvanometer is used. Where support for the upper end of the damping tube is provided by rigidly joining the tube to some part of the instrument, as by cementing the tube to the faces of the magnetic poles, the tube is easily susceptible to breakage as a result of jarring or dropping the galvanometer. This susceptibility to breakage is increased further because of the stresses placed on the tubes as a result of the unequal coefficients of thermal expansion of the glass tube and the metal part of the instrument. My invention overcomes these difficulties. The damping arrangement of the invention includes a supporting means for the upper end of the damping tube which supporting means is sufficiently flexible to absorb impact shocks without damage to the tube and sufficiently rigid to maintain the coaxial alignment between the tube and the enclosed coil and suspension means.

The nature of my invention and its manner of use will be more clearly understood from the following description taken in conjunction with the accompanying drawings in which.

Figure 1:
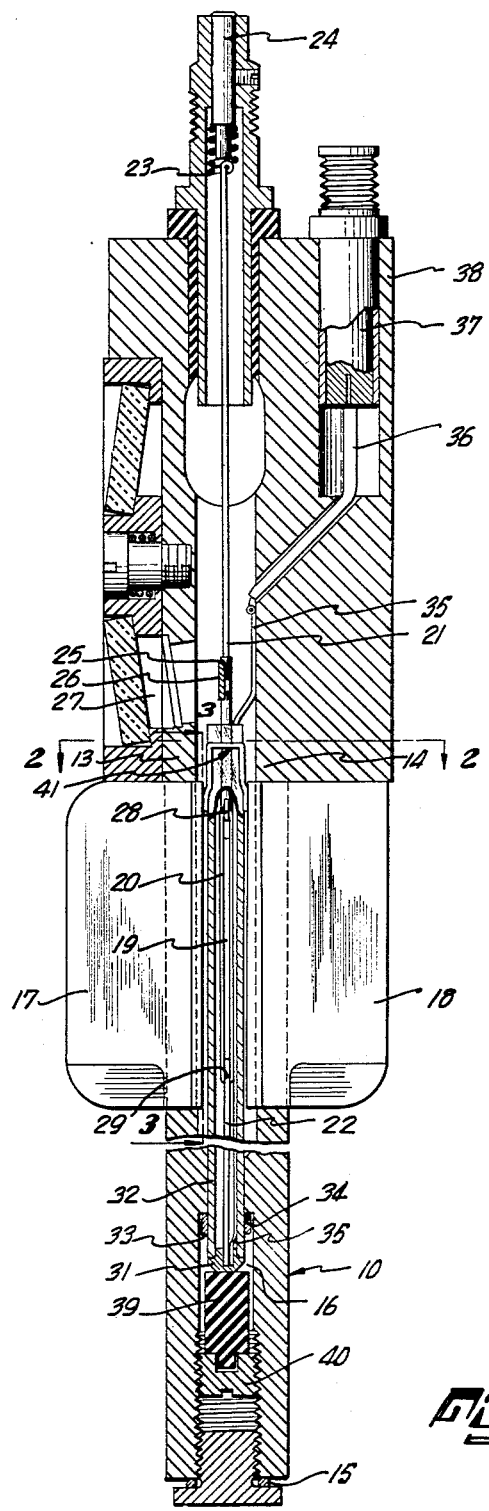
Fig. 1 is a sectional elevation of a galvanometer according to the invention.
Figure 2:
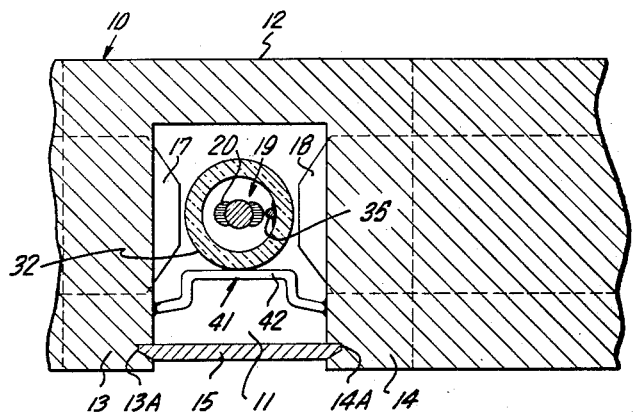
Fig. 2 is a transverse section taken on line 2—2 of Fig. 1.
Figure 3:
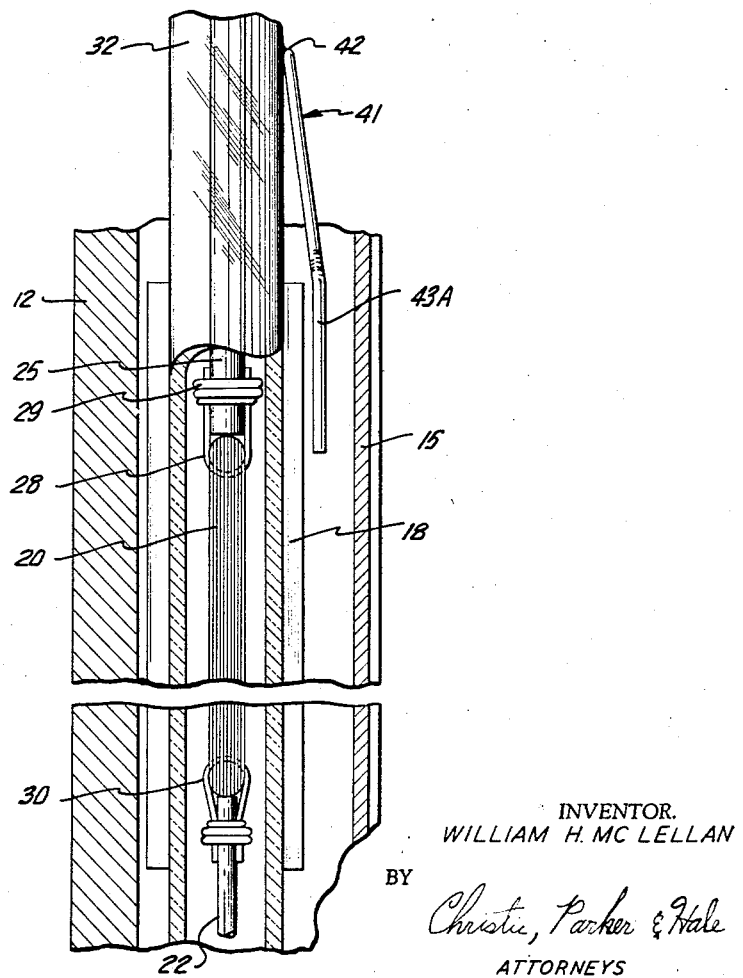
Fig. 3 is an enlarged elevation of a portion of Fig. 1 taken along line 3—3 of Fig. 1.

The galvanometer shown in Figs. 1, 2 and 3 comprises a case 10, the length of the case being many times greater than the cross-sectional dimension of the galvanometer. An elongated groove 11 is provided in the intermediate portion of the case to form back side 12 and two sides 13 and 14. A cover 15 is adapted to be placed on or removed by sliding it in grooves 13A and 14A formed internally in sides 13 and 14. A longitudinal bore 16 is provided in the lower end of the case so as to extend from the end of the case almost into the groove. A pair of pole pieces 17 and 18 are fastened through the sides 13 and 14 of the case so as to leave in a central location in the case a narrow elongated gap 19 between the two pole pieces.

An elongated coil 20 of fine wire shaped to occupy a small cross-sectional area is suspended within the gap between the pole pieces. The coil is composed of a fine insulated wire. The winding is done in such a manner that the coil is substantially cylindrical in form with a circular cross section. The coil is suspended within the air gap between an upper suspension wire 21 and a lower suspension wire 22. The upper end of the upper suspension wire is anchored to a tension spring 23 which in turn is anchored to a central terminal post 24 sealed through the upper end of the case. This central terminal post provides one external contact for the coil. The lower portion of the upper suspension wire is reinforced by a tubular stiffener 25 disposed coaxially about the wire and rigidly joined to the wire as by solder. A mirror 26 is mounted in a notch in the tubular stiffener so as to be in alignment with a window 27 in the wall 13. As shown in Fig. 3, a stirrup 28 attached to the stiffener by turns of wire 29 is looped through the upper end of the coil so as to rigidly attach the upper end of the coil to the stiffener. The lower end of the coil is secured to the upper end of the lower suspension wire by means of a stirrup 30 fastened directly to the lower suspension wire.

The lower end of the lower suspension wire is attached to a conductive solid cap 31 cemented inside the opening at the lower end of a damping tube 32. As shown in Fig. 2, the damping tube is disposed within the galvanometer case so as to be coaxially aligned with the lower suspension wire, the coil and a portion of the upper suspension. A metal washer 33 is cemented to the damping tube near its lower end. This washer, having an I.D. slightly larger than the O.D. of the damping tube, seats upwardly against a shoulder 34 formed internally as an integral part of the galvanometer case. The lower end of a connecting wire 35 is soldered to the solid cap within the damping tube and the other end of the wire is carried upwardly out of the upper end of the tube. The wire is cemented inside the full length of the glass tube. The upper end of the wire is soldered to an electrical lead 36 which passes through an opening in the side wall 14 and is anchored to a side terminal post 37 positioned in a terminal box 38 attached to the upper part of side wall 14. This side terminal post provides the second external contact for the coil.

A resilient plug 39 is disposed within the longitudinal bore in the bottom of the case so as to bear against the cap in the lower end of the damping tube. A compression screw 40 is adapted to be screwed into the threaded portion of the bore in the lower end of the case and bears against the lower end of the resilient plug so that the washer, cemented to the lower end of the damping tube, is pressed against the shoulder formed internally in the case. In this manner the damping tube is sealed against the galvanometer case.

The damping arrangement comprising the damping tube, means for sealing the bottom end of the tube and for providing an anchor for the lower end of the lower suspension wire and means for pressing the washer around the lower end of the damping tube against the shoulder in the galvanometer case is disclosed and claimed in copending application, Serial No. 386,873, filed October 19, 1953, by John R. Tavis now Patent No. 2,873,427.

Figure 4:
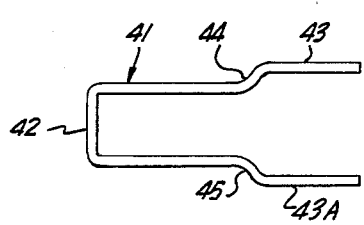
Fig. 4 is a plan view of one form of flexible supporting means according to the invention.
Figure 5:
Fig. 5 is an elevation of the flexible supporting means of Fig. 4.

The upper end of the damping tube is supported by a supporting means 41. As shown in Figs. 4 and 5, the supporting means comprises a U-shaped body including a closed end 42 and opposed sides 43, 43A. From the closed end 42, the two opposed sides extend toward the open end in a parallel spaced apart relationship as shown for a distance approximately one-half of the total length. At the points 44 and 45, each side diverges laterally outwardly at an angle of about 45° for a short distance until the spaced apart relationship between the sides is increased. The sides then extend to the open end in a parallel spaced apart relationship greater than the parallel spaced apart relationship of the opposed sides extending from the closed end. The opposed sides extending from the closed end and the laterally outwardly diverging portions lie in the same plane, which plane is angularly inclined with respect to the plane in which the opposed sides extending to the open end lie.

The supporting means described above is a preferred one in that it provides the proper degree both of flexibility and rigidity. As shown in Figs. 2 and 3, the closed end 42 of the supporting means is cemented to the damping tube and each of the opposed sides 43 and 43A toward the open end is cemented respectively along its length to the wall on opposite sides of the galvanometer case. This construction of the supporting means is particularly advantageous since only the crosspiece is cemented to the damping tube. Therefore, if it becomes necessary to remove the damping tube from the case, the bond may be easily broken. Although other materials providing comparable properties of flexibility and rigidity may be used, copper wire of 0.010 inch diameter has been found to be suitably adapted for use.

As an advantageous modification of the supporting means described above, the connecting crosspiece may be shaped to follow the contour of the damping tube so that the entire length of the crosspiece may be cemented to the damping tube.

Figure 6:
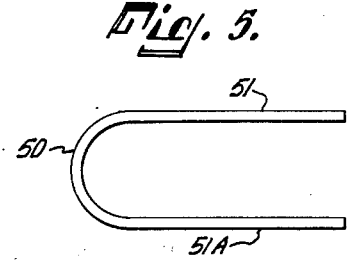
Fig. 6 is a plan view of another embodiment of a flexible supporting means.
Figure 7:
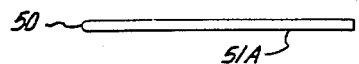
Fig. 7 is an elevation of the flexible supporting means of Fig. 6.

The supporting means may also be constructed in other shapes. In Figs. 6 and 7, another embodiment of a supporting means is shown both in plan view and in elevational view. It comprises a U-shaped body portion having a closed end 50 and opposed parallel sides 51 and 51A. The closed end in this embodiment is rounded and the entire supporting means lies in one plane. Such a supporting means offers the advantage of easy construction. However, because the entire supporting means lies in one plane, it does not provide the degree of support provided by the preferred embodiment previously described.

The manner in which the damping arrangement is assembled within the galvanometer case will be more clearly understood from the following description. The suspension is mounted inside the damping tube and is slipped into the longitudinal bore 16 at the lower end of the galvanometer so that it is seated against the shoulder 34. The top of the suspension is pulled in tension until the coil is positioned within the air gap 19 between the pole pieces 17 and 18. Since the damping tube is unsupported at its upper end, it must be positioned around the coil so that the correct radial clearance is provided between the coil and the inside of the damping tube. Slight variations are found among various suspensions so that it is necessary to alter slightly the position of the damping tube until the proper radial clearance between the tube and the suspension is obtained. When the proper clearance has been established for the particular suspension, the damping tube is positioned temporarily through the use of small rubber wedges. With the damping tube correctly positioned, the flexible support is cemented in place in the manner described above. The damping tube is then filled with a suitable viscous fluid, such as oil, by means of a capillary tube which is inserted to the bottom of the damping tube during the filling operation. After the tube is substantially full, the capillary tube is withdrawn.

The damping arrangement described above has proven successful in maintaining fluid-damped galvanometer suspension alignments under environmental conditions which have caused failure when damping tubes are rigidly mounted. The unique feature of this support is that it provides both rigidity and flexibility sufficient to meet the operating conditions under which galvanometers are used. This combination of properties enables use of the instrument where prior failures occurred, as, for example, under conditions of high temperatures.

I claim:
1. In a galvanometer having a coil suspended by upper and lower suspension means between magnetic poles and enclosed in a case, a damping arrangement comprising in combination a separate damping tube enclosed entirely within the case and surrounding the entire lower suspension, the coil, and part of the upper suspension, a cap sealed in the bottom end of the tube to make it fluid tight and to anchor the lower end of the lower suspension means, and a U-shaped supporting body having a closed end and two opposed sides, the closed end being cemented to the damping tube near its upper end and a portion of each of the opposed sides being cemented re- spectively to opposite interior sides of the galvanometer case, thereby providing sufficient flexibility to absorb impact shock and sufficient rigidity to maintain a predetermined radial alignment between the interior wall of the damping tube and the surrounded lower suspension, the coil and part of the upper suspension.

2. Apparatus in accordance with claim 1 wherein the U-shaped body comprises a closed end and opposed sides, the closed end and a portion of the opposed sides being in a plane angularly inclined to the plane of the open end portion of the opposed sides, the closed end being cemented to the damping tube and each of the opposed sides of the open end portion of the supporting means being cemented respectively to opposite interior sides of the galvanometer case.

3. Apparatus in accordance with claim 1 wherein the U-shaped body comprises a closed end and opposed sides, the sides extending from the closed end in a parallel spaced apart relationship for a portion of their length, diverging laterally outwardly to increase the spaced apart relationship and thereupon extending to the open end in a greater parallel spaced apart relationship, the closed end being cemented to the damping tube and each of the opposed sides toward the open end being cemented respectively to opposite interior sides of the galvanometer case.

4. Apparatus in accordance with claim 1 wherein the U-shaped body includes a closed end portion of the body comprising a closed end and opposed sides extending from the closed end in a parallel spaced apart relationship and then diverging laterally outwardly to increase the spaced apart relationship and an open end portion of the body comprising opposed sides extending integrally from the laterally outwardly diverging ends in a greater parallel spaced apart relationship, the closed end portion being in a plane angularly inclined to the plane of the open end portion, the closed end of the closed end portion being cemented to the damping tube and each of the opposed sides of the open end portion being cemented respectively to opposite interior sides of the galvanometer case.

References Cited in the file of this patent

UNITED STATES PATENTS

| | | |
|---|---|---|
| 1,761,084 | Lissauer | June 3, 1930 |
| 2,519,689 | Morrow | Aug. 22, 1950 |
| 2,657,358 | Richardson | Oct. 27, 1953 |
| 2,668,933 | Shapiro | Feb. 9, 1954 |